(12) United States Patent
Nakazawa et al.

(10) Patent No.: US 7,335,054 B2
(45) Date of Patent: Feb. 26, 2008

(54) WIRING CONNECTOR

(75) Inventors: Yoshihiro Nakazawa, Wako (JP); Koji Kano, Wako (JP); Atsushi Ikematsu, Wako (JP); Kenichi Tamakoshi, Wako (JP); Keishi Takayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/296,437

(22) Filed: Dec. 8, 2005

(65) Prior Publication Data

US 2006/0128185 A1 Jun. 15, 2006

(30) Foreign Application Priority Data

Dec. 15, 2004 (JP) ............... 2004-363603

(51) Int. Cl.
*H01R 31/08* (2006.01)
(52) U.S. Cl. ............ 439/511; 439/510
(58) Field of Classification Search .......... 439/511, 439/510, 660, 924.1, 924.2, 92, 342, 285, 439/289, 37, 131, 134, 135, 136, 142, 669, 439/668
See application file for complete search history.

(56) References Cited

U.S. PATENT DOCUMENTS

| | | | | |
|---|---|---|---|---|
| 4,483,575 A | * | 11/1984 | Kruger et al. | ............... 439/102 |
| 5,112,239 A | * | 5/1992 | Yagi et al. | ............... 439/189 |
| 5,344,327 A | * | 9/1994 | Brunker et al. | ............. 439/108 |
| 5,788,519 A | * | 8/1998 | Stern | ............... 439/189 |
| 5,823,810 A | * | 10/1998 | Takahashi et al. | .......... 439/188 |
| 6,193,549 B1 | * | 2/2001 | Suzuki et al. | ............... 439/589 |
| 2002/0009909 A1 | | 1/2002 | Kondo | |
| 2004/0115973 A1 | * | 6/2004 | Fujii et al. | .................... 439/97 |

FOREIGN PATENT DOCUMENTS

JP 63-33509 9/1988

OTHER PUBLICATIONS

European Search Report dated Mar. 31, 2006 with Office Action.

* cited by examiner

*Primary Examiner*—Tho D. Ta
*Assistant Examiner*—Travis Chambers
(74) *Attorney, Agent, or Firm*—Westerman, Hattori, Daniels & Adrian, LLP.

(57) ABSTRACT

A wiring connector having a connector housing made of an insulator and a plurality of stages of terminal rows provided in the connector housing. The plurality of stages of terminal rows includes a first terminal row and a second terminal row and the first and second terminal rows each comprise a plurality of terminals. The base of the first terminal row is attached to the base of said second terminal row and a new connection terminal formed at a turndown.

8 Claims, 8 Drawing Sheets

COMPARATIVE EXAMPLE

FIG. 7B

EMBODIMENT

FIG. 8A

COMPARATIVE EXAMPLE

FIG. 8B

EMBODIMENT

WIRING CONNECTOR

FIELD OF THE INVENTION

The present invention relates to a wiring connector capable of collectively outputting a plurality of input side interconnections.

BACKGROUND OF THE INVENTION

Various types of wiring connectors have been put to use. Typically, the type of wiring connector selected depends on the user's intended use. For example, a collection wiring connector is used in order to collectively output a plurality of input side interconnections, and a branch wiring connector is used in order to branch a single wiring into a plurality of output interconnections.

A wiring connector that is provided with two stages of a plurality of terminal rows is known. Such is disclosed, for example, in Japanese Utility Model Publication No. Sho 63-33509 (Pages 4 and 5, FIGS. 4 and 5.)

Generally, a wiring connector is composed of a connector housing made of an insulator and a terminal group arranged in the connector housing, wherein the terminal group is integrally formed of a plurality of terminals. The terminal group is also formed into a first terminal row and a second terminal row each having a plurality of terminals by folding it back at the center portion thereof. However, if the first terminal row and the second terminal row have a different number of terminals, then the terminal groups are different in shape from each other. This provides a drawback in that the wiring connector is difficult to manufacture.

In addition, the wiring connector is formed to include the first and the second terminal row each having a plurality of terminals by folding it back at the center portion thereof. This provides a drawback in that it is difficult to integrally form more than two stages of terminals.

Accordingly, one object of the present invention is to provide a wiring connector capable of preventing the shapes of terminal groups from differing from each other and arbitrarily increasing the number of stages of terminal rows.

SUMMARY OF THE INVENTION

It is one object of the present invention to provide a wiring connector capable of solving the problem in that terminal groups are different in shape from each other so as to become difficult to manufacture. It is another object of the present invention to provide a wiring connector capable of solving the problem in that three or more stages of terminals cannot be integrally formed.

According to the present invention, in order to attain the above objects, a first aspect of the present invention provides a wiring connector which includes a connector housing made of an insulator and a plurality of stages of terminal rows arranged in the connector housing, wherein the terminal rows are each formed of a plurality of terminals connected to each other. Terminal rows adjacent to each other among the plurality of terminal rows are called a first terminal row and a second terminal row and respective bases of at least the first and second terminal rows adjacent to each other are formed integrally with each other. In addition, a turndown adapted to attach the first and second terminal rows to the connector housing is formed by folding back the bases, and a new connection terminal is formed at the turndown.

Accordingly, the variations of the wiring connector can be increased, and the number of interconnections connectable at the same time can be increased.

Also, since the base of at least the first terminal row and the second terminal row adjacent to each other are formed integrally with each other, the number of terminals of the plurality of terminal rows can be freely set. Therefore, the variations of the wiring connector can be increased. Also, the number of stages of the terminal rows can be arbitrarily increased. Therefore, the number of interconnections connectable to each other at the same time can be increased.

Further, since the turndown is formed to attach the first and second terminal rows to the connector housing, and the new connection terminal is formed at the turndown, the use applications of the wiring connector can be increased.

In a second aspect of the present invention, the first terminal row has a different number of terminals than a second terminal row.

Accordingly, a wiring connector can be realized which is adaptable to arbitrary use applications.

According to a third aspect of the present invention, the new connection terminal serves as a base terminal. Since the new connection terminal is formed at the turndown, the position of the output side terminal can be identified easily, better facilitating wiring.

According to a fourth aspect of the present invention, the new connection terminal and a terminal near the new connection terminal serve as base terminals and the remaining terminals serve as branch terminals.

Accordingly, those positions can be more easily identified and the rated power consumption of the wiring connector can be improved. Also, even if one of the base terminals develops trouble, another base terminal can complement the function of the base terminal in trouble. This improves the reliability of the wiring connector.

According to a fifth aspect of the present invention, an independent terminal row, electrically independent of the first terminal row and the second terminal row, is arranged on the same plane as the first terminal row or the second terminal row. Therefore, the space of the connector housing can be utilized more effectively.

According to a sixth aspect of the present invention, a hole portion is formed in a sidewall of the connector housing, and the new connection terminal is introduced to the exterior of the connector housing through the hole portion, and a harness is extended from the connection terminal. Accordingly, the degree of freedom of the wiring can be increased and the use applications of the connection terminal can be increased.

According to a seventh aspect of the present invention, the new connection terminal and a terminal near the new connection terminal serve as base terminals. Accordingly, the power supply ground can be reinforced.

BRIEF DESCRIPTION OF THE DRAWINGS

A preferred embodiment of the present invention will be described with reference to the accompanying drawings, wherein.

DETAILED DESCRIPTION OF THE INVENTION

Embodiments of the invention will be described below with reference to the accompanying drawings. The drawings shall be viewed from the direction of reference numerals.

Figure 1:
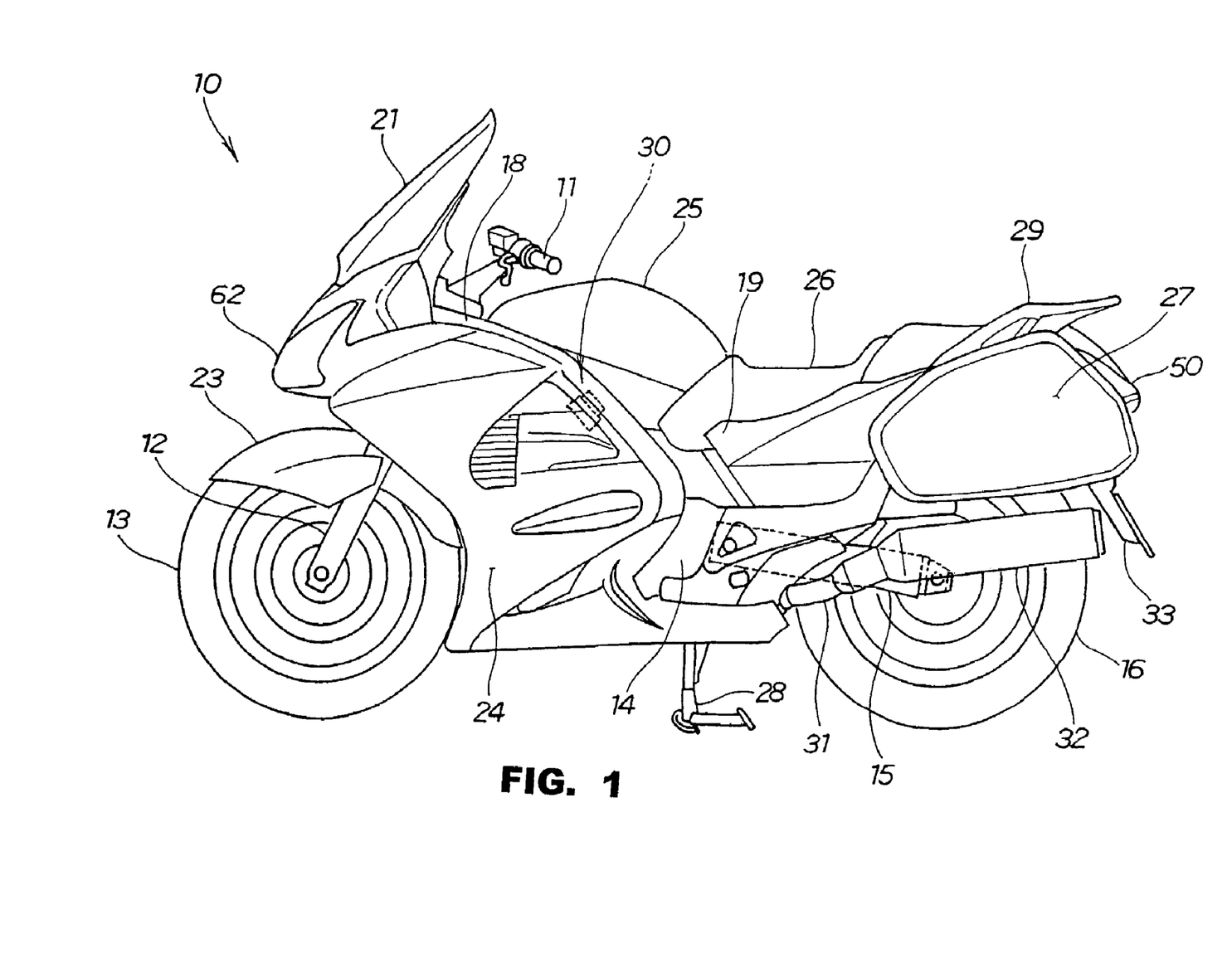
FIG. 1 is a side view of a motorcycle employing a wiring connector according to the present invention.

FIG. 1 is a lateral view of a motorcycle employing a wiring connector according to the present invention. In the figure, a motorcycle 10 includes a handlebar 11, a front fork 12 and a front wheel 13 steered by the handlebar 11, which are disposed in the front portion 18 of a vehicle body. A body frame 14 is disposed along from the front portion 18 to the middle portion 19 of the vehicle body and an engine (not shown) is mounted on the body frame 14. A swing arm 15 is swingably attached to the lower portion of the body frame 14 and a rear wheel 16 is attached to the rear end of the swing arm 15.

In the figure, reference numeral 21 denotes a windscreen, 62 a headlamp, 23 a front fender, 24 a cowling, 25 a fuel tank, 26 a seat, 27 a saddle bag, 28 a stand, 29 a grab rail, 31 an exhaust pipe, 32 a muffler, 33 a rear fender, and 50 a tail lamp.

In addition, reference numeral 30 denotes a wiring connector. As described later, this wiring connector (branch connector) 30 is a connector capable of increasing the number of interconnections that can be simultaneously connected thereto and expanding its applications.

Figure 2:
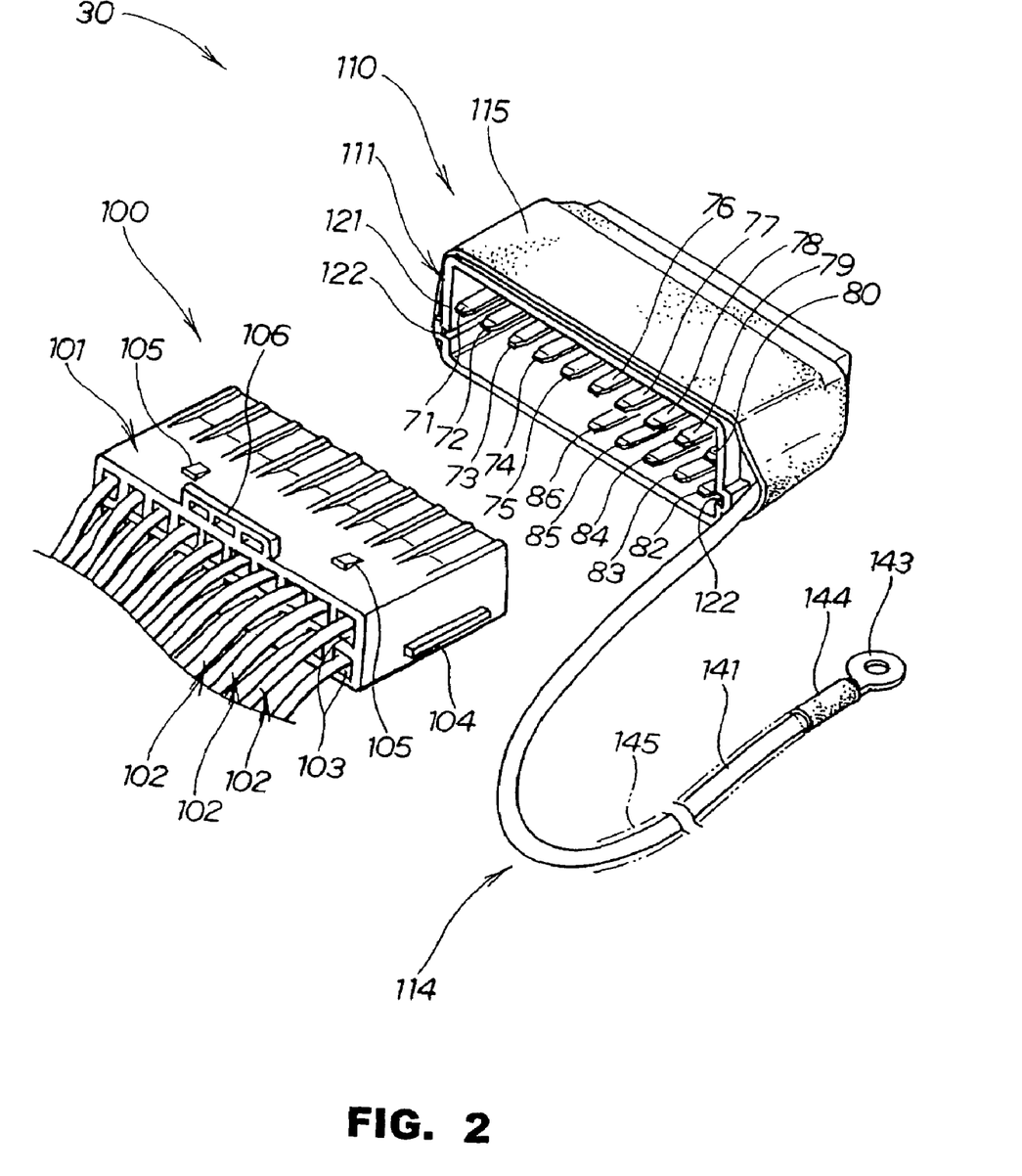
FIG. 2 is a perspective view of the wiring connector according to the present invention.

FIG. 2 is a perspective view of the wiring connector of the present invention with an I-shaped terminal group 113 (see FIG. 5) omitted, described later.

A wiring connector 30 is composed of a male connector (plug) 100 and a female connector (socket) 110 adapted to receive the male connector 100. This wiring connector 30 is adapted to assemble the grounding wires of a plurality of connection equipment into several grounding wires, which are connected to a predetermined earth point.

Specific examples of how the wiring connector 30 is used will be described with reference to the next figure.

Figure 3:
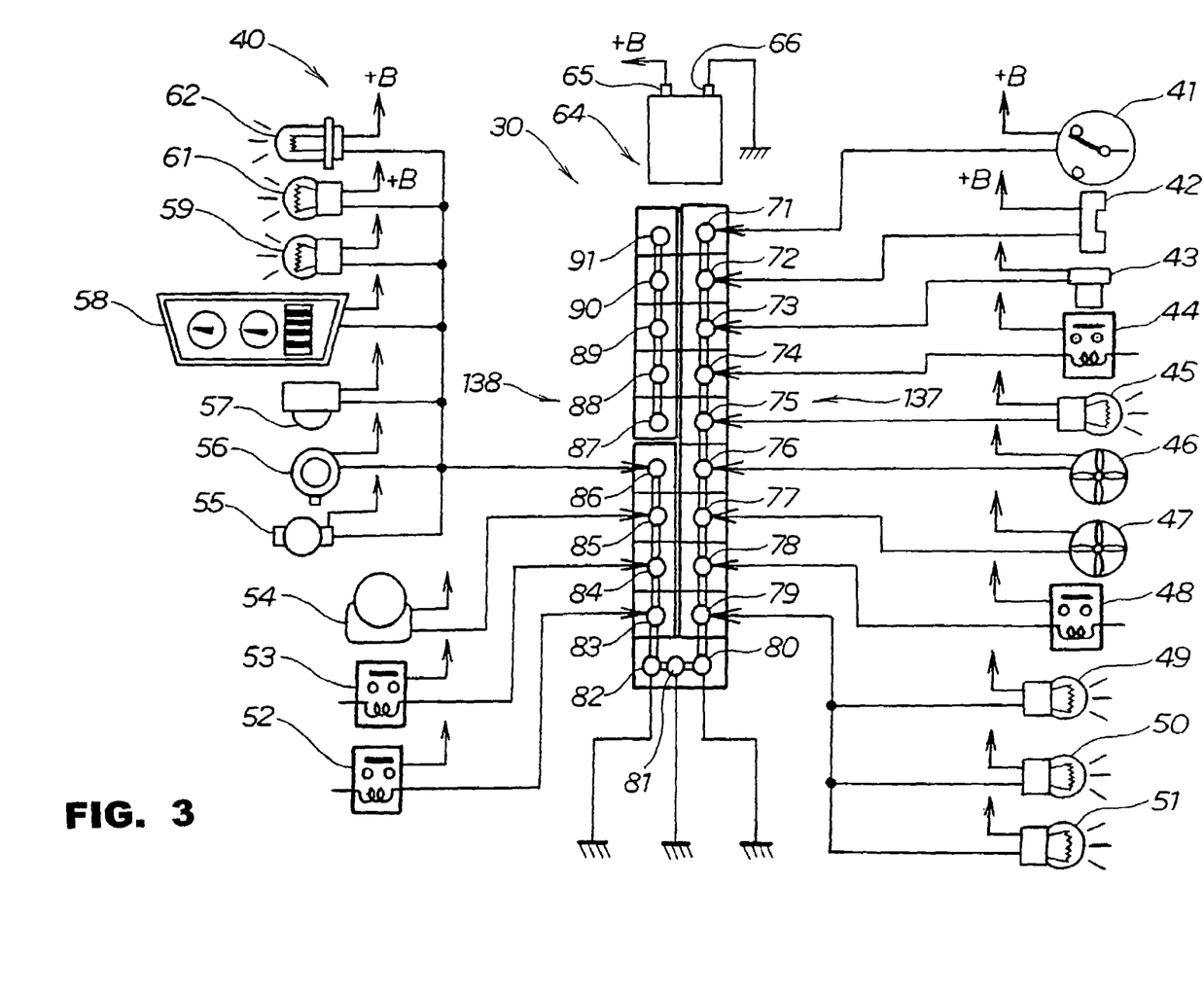
FIG. 3 is a wiring block diagram of the motorcycle employing the wiring connector according to the present invention.

FIG. 3 is a wiring block diagram of the motorcycle employing the wiring connector according to the present invention. A wiring system 40 is shown in FIG. 3. Wiring system 40 is one example of use of the wiring connector 30.

Reference numeral 41 denotes an up-down switch, 42 an option terminal, 43 a water temperature sensor, 44 a screen relay, 45 a right rear signal, 46 a first fan, 47 a second fan, 48 a stop lamp relay, 49 a left rear signal, 50 a tail lamp, 51 a stop lamp, 52 a low beam head lamp relay, 53 high beam head lamp relay, 54 a fuel pump, 55 an electrically driven screen, 56 a horn, 57 a bank angle sensor, 58 a meter, 59 a right front signal, 61 a left front signal, and 62 a head lamp.

Incidentally, the components denoted by reference numerals 41 through 62 are generically named "the connection equipment 41 to 62" in this specification.

The wiring system 40 is such that the grounding ends of the connection equipment 41 to 62 are connected to respective terminals of the wiring connector 30, namely, "a 1st terminal" 71 to "a 9th terminal" 79 and "a 13th terminal" 83 to "a 16th terminal" 86, and +B ends of the connection equipment 41 to 62 are connected to +B (plus) terminal 65 of a battery 64 or a power supply. Reference numeral 66 denotes the ground (minus) of the battery 64.

"A 10th terminal" 80 as a terminal, "a 11th terminal" 81 as a new connection terminal, and "a 12th terminal" 82 as a terminal each serve as an output side grounding wire which collects input side grounding wires received from "the 1st terminal" 71 though "the 9th terminal" 79 and "the 13th terminal" 83 through "the 16th terminal" 86 as base terminal side grounding wires and outputs them.

Also, "the 1st terminal" 71 through "the 16th terminal" 86 are terminals electrically and mechanically connected to one another.

Whereas, "the 17th terminal" 87 through "the 21st terminal 91" are terminals electrically and mechanically connected to one another and separated from "the 1st terminal" 71 through "the 16th terminal" 86. "The 17th terminal" 87 through "the 21st terminal" 91 are used as sensor grounding terminals in the present embodiment. However, "the 17th terminal" 87 through "the 21st terminal" 91 may be used as circuit terminals other than the grounding terminals.

The detailed shape of the wiring connector 30 will be described below.

Figure 4:
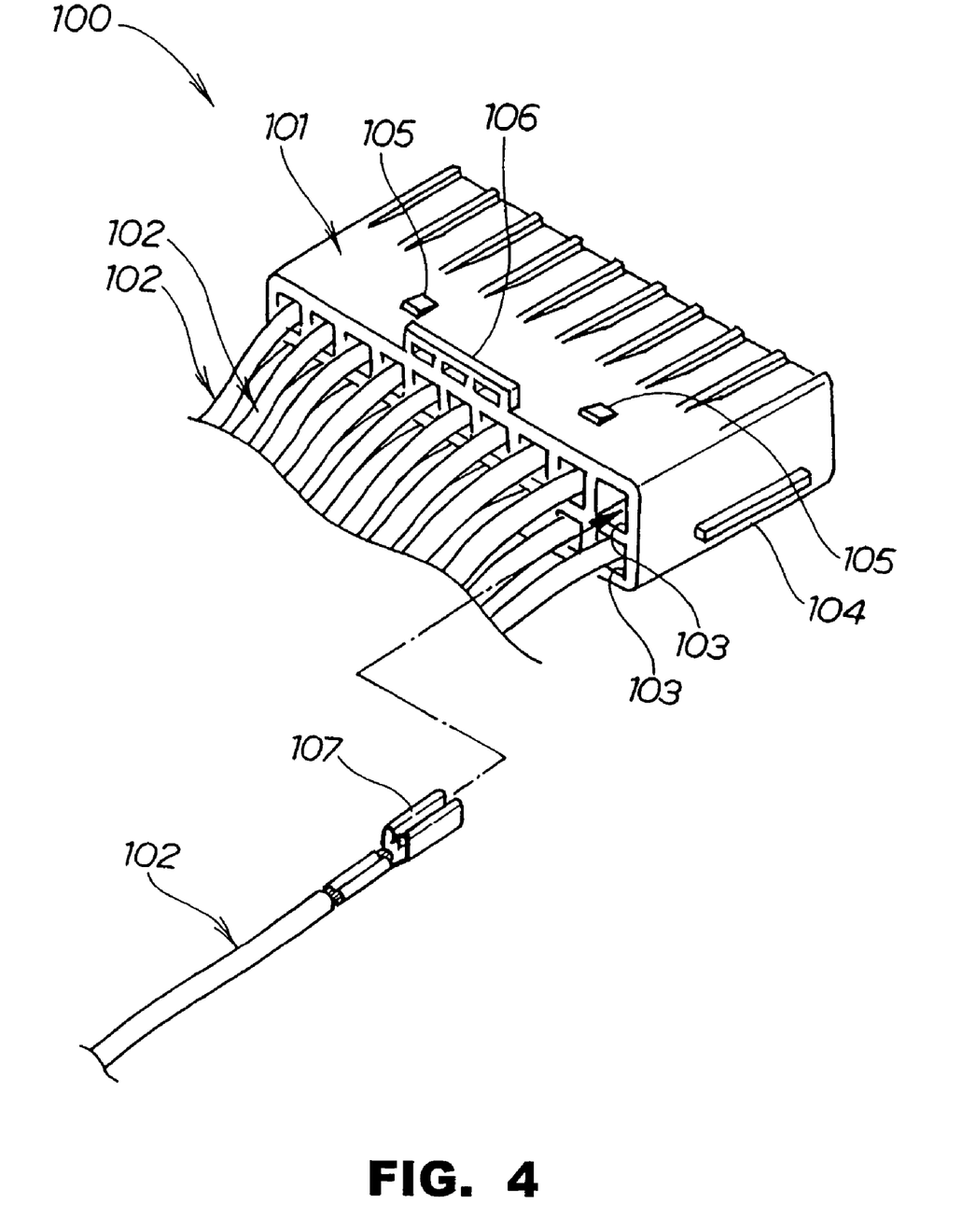
FIG. 4 is an exploded perspective view of a male connector of the wiring connector according to the present invention.

FIG. 4 is an exploded perspective view of the male connector of the wiring connector according to the present invention. The male connector 100 is composed of a male housing 101 made of an insulator and cables 102 . . . (symbol " . . . " denotes plurality, and the same holds true of the following) fixedly inserted into the male housing 101.

The male housing 101 includes tube-like parts 103 adapted to fixedly press fit the cables 102 . . . , rails 104, 104 (one of the rails 104 is omitted) used to insert the male housing 101 into the female connector 110 in a predetermined direction, locking claws 105, 105 adapted to be locked to the female connector 110, and an engaging part 106 used to withdraw the male housing 101 from the female connector 110 (see FIG. 2).

Each of the cables 102 is provided with a male terminal 107 adapted to be fixedly inserted into the tube-like part 103.

Figure 5:
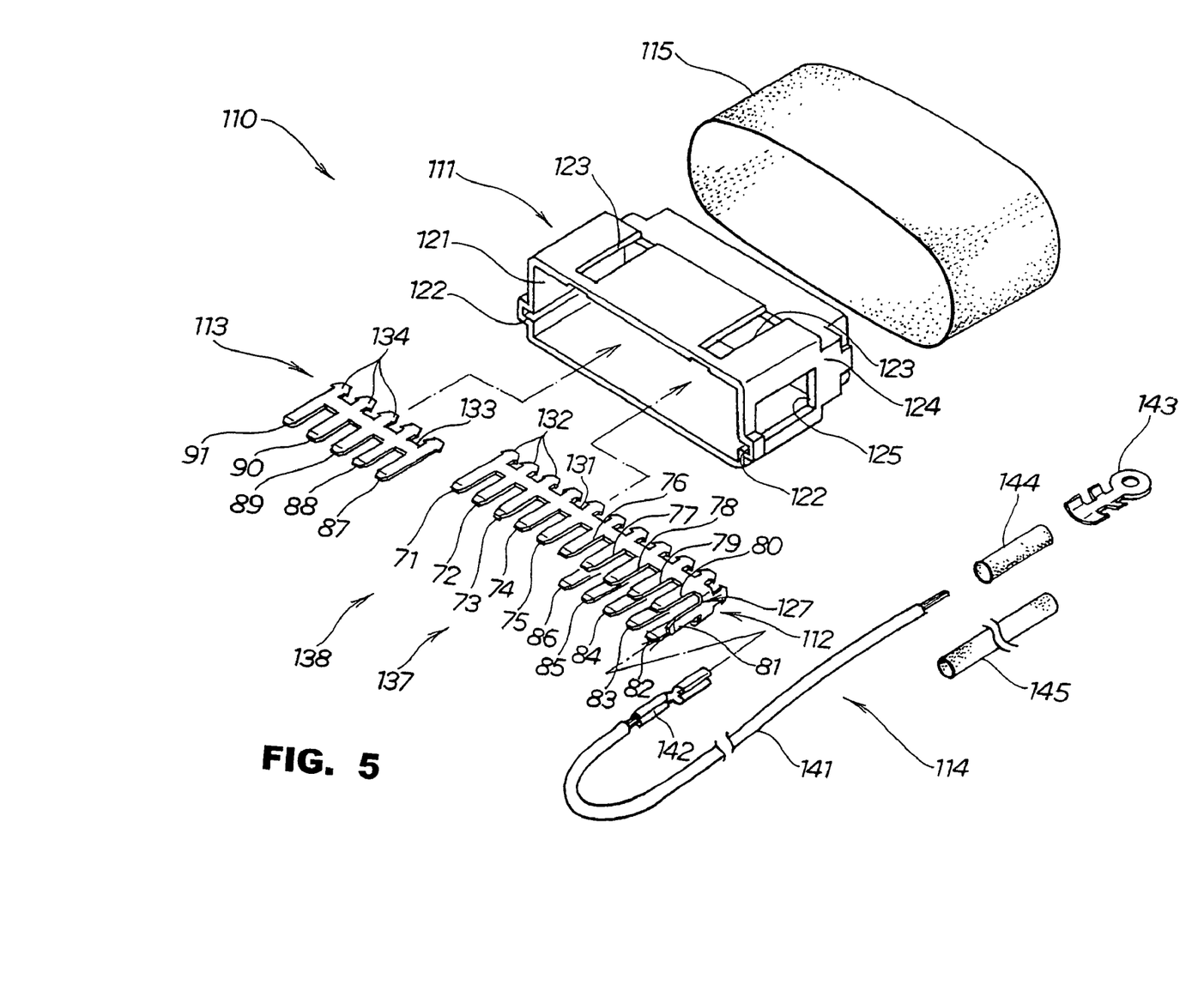
FIG. 5 is an exploded perspective view of a female connector of the wiring connector according to the present invention.

FIG. 5 is an exploded perspective view of the female connector of the wiring connector according to the present invention. The female connector 110 includes a connector housing 111 made of an insulator, a U-shaped terminal group 112, an I-shaped terminal group 113, a harness 114, and a heat shrinkage tube 115. The U-shaped terminal group 112 is in a generally U-shape and is adapted to be fixedly press fitted (attached) to the connector housing 111. The I-shaped terminal group 113 is formed linear (I-shaped) as a row of independent terminals and is adapted to be fixedly press fitted (attached) to the connector housing 111. The harness 114 is connected to "the 11th terminal" 81 as a new connector terminal (terminal) of the U-shaped terminal group 112. The heat shrinkage tube 115 shields retaining holes 123, 123 and a hole portion 125 and supports the harness 114 by being overlaid on the sidewalls 124 of the connector housing 111.

Figure 6:
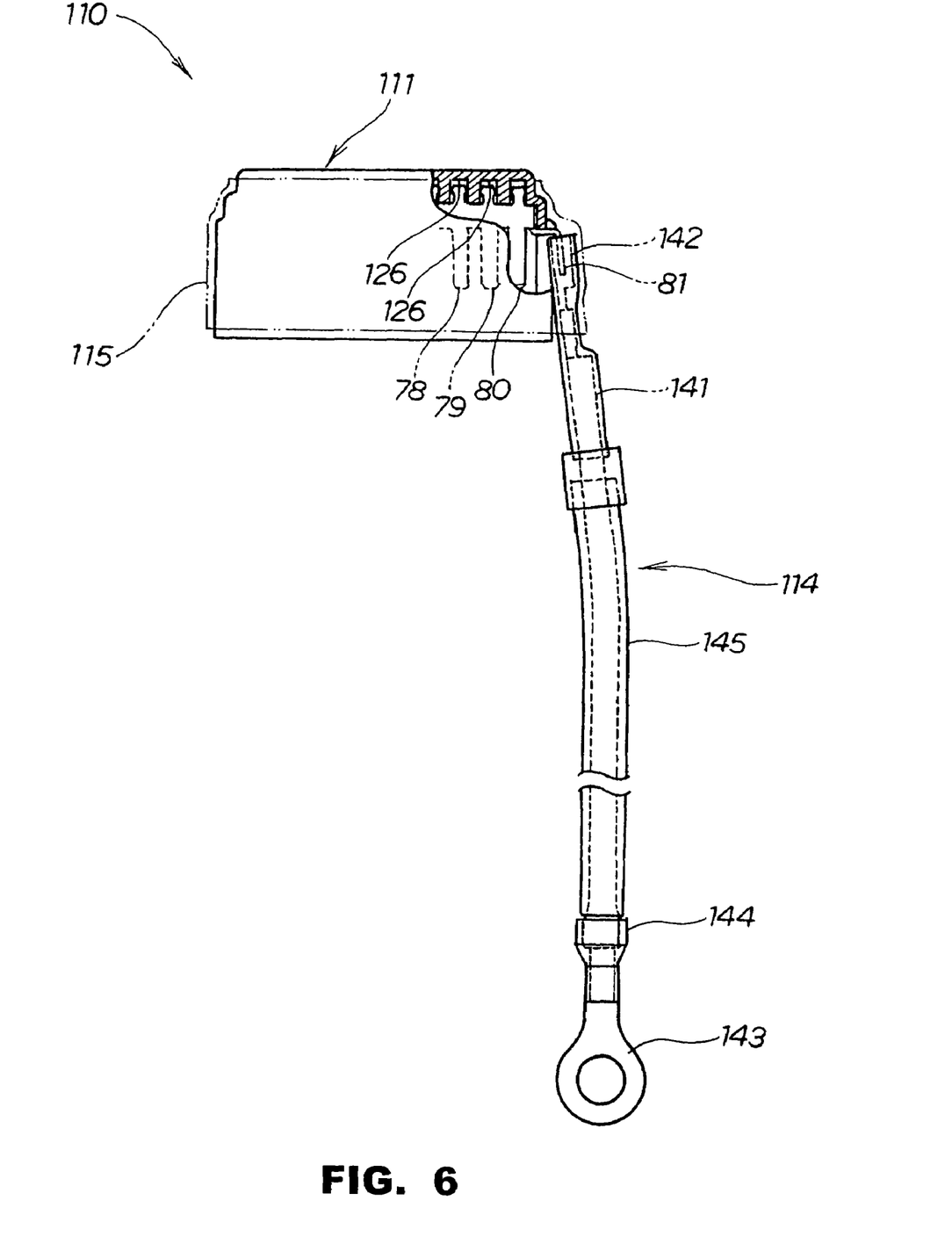
FIG. 6 is a plan view of the female connector of the wiring connector according to the present invention.

The connector housing 111 is formed with a storage recess portion 121, guide portions 122, 122 retaining holes 123, 123 a hole portion 125 and press fit portions 126 (see FIG. 6). The storage recess portion 121 is adapted to store the U-shaped terminal group 112 and the I-shaped terminal group 113. The guide portions 122, 122 are adapted to guide the rails 104, 104 of the male housing 101. The retaining holes 123, 123 are adapted to retain the locking claws 105, 105 of the male housing 101. The hole portion 125 is adapted to extend the harness 114 and "the 11th terminal" 81 out of the connector housing 111 to the exterior thereof. Incidentally, "the 11th terminal" 81 of the U-shaped terminal group 112 is formed at a turndown 127.

The U-shaped terminal group 112 is formed of "the 1st terminal" 71 through "the 16th terminal" 86, a base 131 adapted to electrically and mechanically connect "the 1st terminal" 71 through "the 16th terminal" 86, press fit pins 132 . . . formed at the base 131 so as to correspond to "the 1st terminal" 71 through "the 16th terminal" 86, and the turndown 127 adapted to turn down the U-shaped group 112 in a U-shaped manner.

The I-shaped terminal group 113 is formed of "the 17th terminal" 87 through "the 21st terminal" 91, a base 133 adapted to electrically and mechanically connect "the 17th terminal" 87 through "the 21st terminal" 91, and press fit pins 134 . . . formed at the base 133 so as to correspond to "the 17th terminal" 87 through "the 21st terminal" 91.

"The 1st terminal" 71 through "the 10th terminal" 80 of the U-shaped terminal group 112 constitute a first terminal row 137. "The 12th terminal" 82 through "the 16th terminal" 86 of the U-shaped terminal group 112 and "the 17th terminal" 87 through "the 21st terminal" 91 of the I-shaped terminal group 113 constitute a second terminal row 138.

In the wiring connector 30 in which the connector housing 111 is formed of an insulator, the terminal rows 137, 138 formed of the plurality of the terminals 71 to 91 attached to the connector housing 111, and a plurality of stages of the terminal rows 137, 138 are arranged in the connector housing 111, if adjacent terminal rows included in the plurality of stages of the terminal rows 137, 138 are called a first terminal row 137 and a second terminal row 138, at least the bases 131 of the first terminal row 137 and the second terminal row 138 are formed integrally with each other and the turndown 127 is formed to attach the first and second terminal rows 137, 138 to the connector housing 111, and "the 11th terminal" 81 or a new connection terminal is formed at the turndown 127.

For instance, if it is possible to freely set the number of terminals included in a plurality of terminal rows, preferably the variations of the wiring connector can be increased. If the number of stages of terminal rows can be arbitrarily increased, preferably the number of interconnections connectable at the same time can be increased.

In other words, since the bases 131 of at least the first terminal row 137 and the second terminal row 138 adjacent to each other are formed integrally with each other, the number of terminals of the plurality of terminal rows 137, 138 can be freely set. Consequently, the variations of the wiring connector 30 can be increased. In addition, since the bases 131 of at least the first terminal row 137 and the second terminal row 138 adjacent to each other are formed integrally with each other, the number of stages of the terminal rows can be arbitrarily increased. As a result, the number of wires connectable at the same time can be increased.

Further, since the turndown 127 is formed to attach the first and second terminal rows 137, 138 to the connector housing 111, and the new connection terminal 81 is formed at the turndown 127, the use applications of the wiring connector 30 can be increased. In addition, when a particular input terminal or output terminal is connected to a new connection terminal, the position of new connection terminal can be identified easily.

Also it can be said that the wiring connector 30 is formed such that the number of the terminals included in the first terminal row 137 electrically conducted to each other is made different from the number of the terminals included in the second terminal row 138 electrically conducted to the first terminal rows 137.

Since the wiring connector 30 is formed such that the number of the terminals included in the first terminal row 137 electrically conducted to each other is made different from the number of the terminals included in the second terminal row 138 electrically conducted to the first terminal rows 137, the wiring connector can be realized which is adaptable to arbitrary use applications.

As shown in FIG. 3, the wiring connector 30 is configured such that "the 11th terminal" 81 or the new connection terminal is an output side terminal to the ground, serving as a base terminal of the branch connector.

For example, since the new connection terminal 81 is formed at the turndown 127, the position of the output side terminal can be identified easily.

As shown in FIG. 3, the wiring connector 30 is configured such that the terminals ("the 10th terminal" 80 and "the 12th terminal" 82) near the new connection terminal 81 are base terminals (output side terminals in the embodiment) and the remaining terminals ("the 1st terminal" 71 through "the 9th terminal" 79 and "the 13th terminal" 83 through "the 16th terminal" 86) are branch terminals (input side terminals in the embodiment). Therefore, the rated power consumption of the wiring connector can be improved. In addition, even if one of the base terminals develops trouble, other base terminals can complement the function of the base terminal in trouble. Consequently, the wiring connector can be improved in reliability.

Since the wiring connector 30 is configured such that the independent terminal row (I-shaped terminal row) 113 electrically independent of "the 12th terminal" 82 through "the 16th terminal" 86, which are electrically and mechanically connected to the first terminal row 137, is disposed in the second terminal row 138, the space of the connector housing 111 can be utilized effectively.

The wiring connector 30 has the hole portion 125 formed in the sidewall 124 of the connector housing 111. "The 11th terminal" 81 or the new connection terminal is introduced to the exterior of the connector housing 111 through the hole portion 125 and the harness 114 is extended from the connection terminal 81. Therefore, the degree of freedom of the wiring can be increased in terms of design and the use applications of the connection terminals 81 can be increased.

As shown in FIG. 3, the wiring connector 30 intends to reinforce the power supply ground by allowing the new connection terminal 81 and the terminals ("the 10th terminal" 80 and "the 12th terminal" 82) near the new connection terminal 81 to serve as the base terminals of the branch connector (wiring connector).

FIG. 6 is a plan view of the female connector of the wiring connector according to the present invention.

The harness 114 is composed of a harness body 141, a harness side terminal 142 attached to one end of the harness body 141, a lug terminal 143 attached to the other end of the harness body 141, a tube 144 covering the lug terminal 143 and the other end of the harness body 141, and a protection tube 145 covering the harness body 141.

The wiring connector 30 (see FIG. 2) has the hole portion 125 formed in the sidewall 124 (see FIG. 5) of the connector housing 111, "the 11th terminal" 81, or the new connection terminal 81, is introduced to the exterior of the connector housing 111 through the hole portion 125 and the harness 114 is extended from the connection terminal 81. Thus, the use applications of the connection terminal 81 can be increased.

Figure 7A:
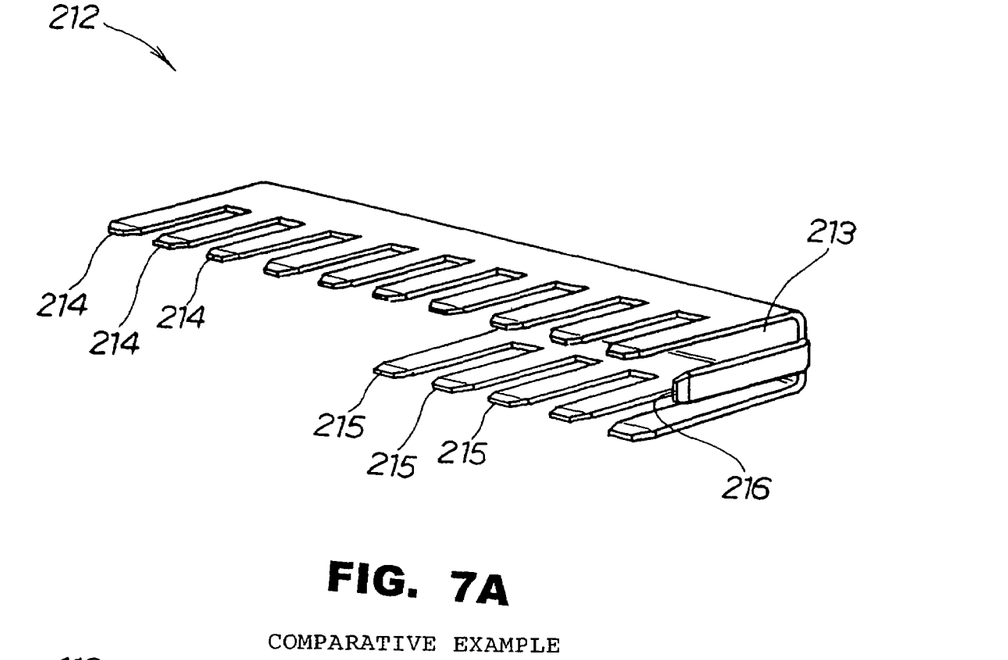
FIG. 7 includes comparatively explanatory views of the terminal group of a conventional wiring connecter and the U-shaped terminal group of the wiring connector according to the present invention.
Figure 7B:
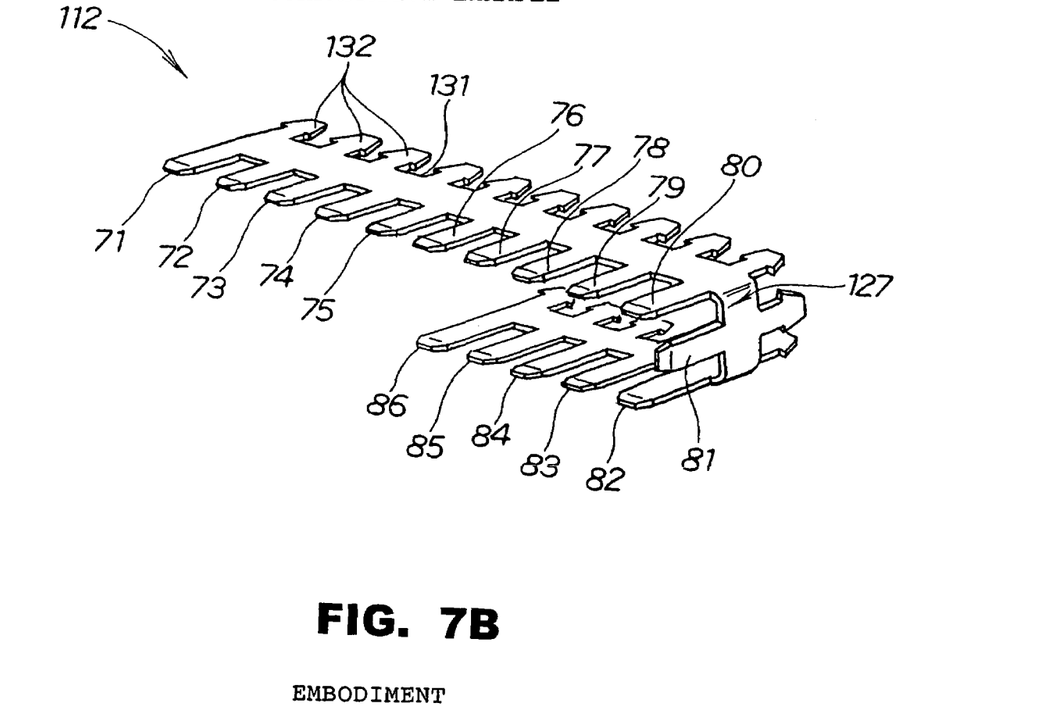

FIGS. 7(a) and 7(b) are comparatively explanatory views of a terminal group of a conventional wiring connector and the U-shaped terminal group of the wiring connector according to the present invention. FIG. 7(a) depicts a U-shaped terminal group 212 by way of comparative example and FIG. 7(b) depicts the U-shaped terminal group 112 of the present embodiment.

In FIG. 7(a), the U-shaped terminal group 212 is formed by setting up a plurality of terminals 214 . . . , 215 . . . , 216 . . . from a bottom portion 213. Accordingly, it is difficult to form three or more stages of terminal rows, that is, it is impossible to realize a wiring connector having multiple stages of terminal rows.

In FIG. 7(b), the U-shaped terminal group 112 is formed by connecting the terminals 71 through 86 continuously. Accordingly, a multiple stage wiring connector having two or more terminal rows can be realized by a plurality of turndowns such as the turndown 127.

Figure 8A:
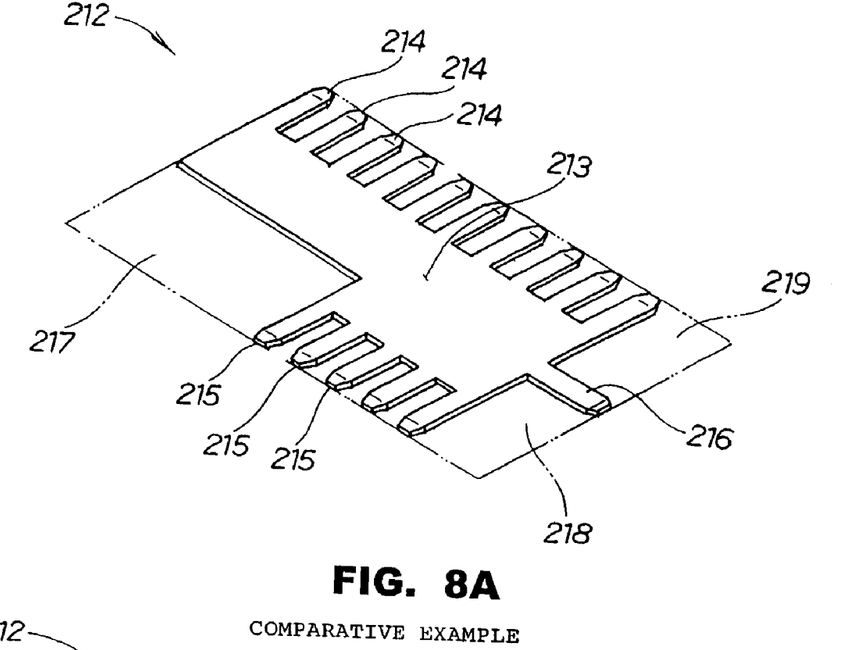
FIG. 8 includes comparatively explanatory views of the terminal group of a conventional wiring connecter and the U-shaped terminal group of the wiring connector according to the present invention, illustrating the developed shapes thereof.
Figure 8B:
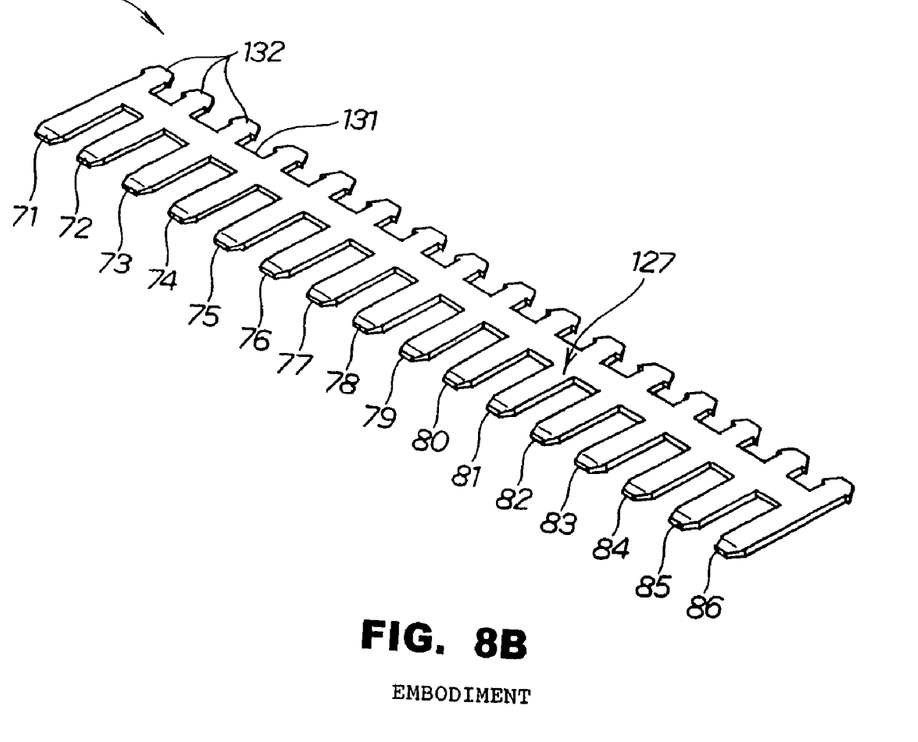

FIGS. 8(a) and 8(b) are comparatively explanatory views of the terminal group of a conventional wiring connector and the U-shaped terminal group of the wiring connector according to the present invention, illustrating the developed states thereof. FIG. 8(a) is exemplification in a case of manufacturing the U-shaped terminal group having the same shape through the conventional bending and illustrates the U-shaped terminal group 212 as a comparative example. FIG. 8(b) illustrates the U-shaped terminal group 112 according to the embodiment of the present invention.

In FIG. 8(a), the U-shaped terminal group 212 is formed by setting up a plurality of terminals 214 . . . , 215 . . . , 216 from a bottom portion 213. Thus, waste portions of the material 217, 218, and 219 are produced to degrade efficiency and to increase the cost of the wiring connector in some cases.

In FIG. 8(b), the U-shaped terminal group 112 is formed by allowing the base portion 131 to connect the terminals 71 through 86. Thus, the material can be utilized effectively to reduce the cost of the wiring connector 30 and to improve the productivity of the wiring connector 30.

In addition, a long terminal group is cut away as appropriate into a variety of terminal groups whose numbers of terminals are different from one another, which can be used for a wiring connector having a plurality of rows.

Incidentally, while the wiring connector according to the present invention is configured such that "the 1st terminal" 71 through "the 21st terminal" have the same shape as shown in FIG. 5, the wiring connector of the invention is not limited this configuration. For example, "the 11th terminal" 81 may be formed thicker so as to increase its current capacity.

While the wiring connector according to the present invention is configured to have the two stages of terminal rows 137, 138 as shown in FIG. 5, the wiring connector of the invention is not limited to this configuration. The number of the stages of terminal rows may be three or more.

The wiring connector according to the present invention is configured such that the independent terminal row (I-shaped terminal group) 113 independent electrically of the second terminal row 138 is arranged on the same plane as the second terminal row 138. However, the wiring connector of the invention is not limited to this configuration, that is, the independent terminal row independent electrically of the other terminal rows may be arranged on another terminal row.

While the invention is configured such that the base terminal is arranged on the ground output side and the branch terminal is arranged on the ground input side, the invention is not limited to this configuration. The configuration may be such that the base terminal is arranged on the ground input side and the branch terminal is arranged on the ground output side.

While the present invention uses the wiring connector for the grounding circuit, the application is not limited to the grounding circuit. The application is arbitrary.

In addition, the wiring connector may be used in such a way as to cut away or bend the press fit pin 132 just below the turndown 127. This makes it possible to divert a conventional connector housing without a socket for the press fit pin 132 to the present invention by forming the hole portion 125 in the conventional connector housing.

The wiring connector according to the present invention may be applied to relatively large motorcycles having many various accessories.

In this detailed description of the invention, reference is made to the accompanying drawings, which form a part hereof, and within which are shown by way of illustration specific embodiments by which the invention may be practiced. It is understood that other embodiments may be utilized and structural changes may be made without departing from the scope of the invention.

We claim:

1. A wiring connector comprising a connector housing made of an insulator and a plurality of stages of terminal rows provided in the connector housing, wherein the plurality of stages of terminal rows comprise:
a first terminal row and a second terminal row, wherein said first and second terminal rows comprise a plurality of terminals and a base of said first terminal row is attached to a base of said second terminal row; and
a new connection terminal formed on a turndown,
wherein said turndown attaches said first and second terminal rows to the connector housing,
wherein said new connection terminal extends in the same direction as said plurality of terminals,
wherein a sidewall of the connector housing further comprises an aperture, and
wherein said new connection terminal is exposed to the exterior of the connector housing through said aperture, and a harness is extended from said new connection terminal.

2. The wiring connector according to claim 1, wherein said first terminal row comprises a different number of terminals than said second terminal row.

3. The wiring connector according to claim 2, further comprising a third terminal row, wherein said third terminal row is electrically independent of said first terminal row and said second terminal row, and said third terminal row is arranged on the same plane as said first terminal row or said second terminal row.

4. The wiring connector according to claim 1, wherein said new connection terminal serves as a base terminal.

5. The wiring connector according to claim 4, wherein said new connection terminal and a terminal near said new connection terminal serve as base terminals.

6. The wiring connector according to claim 1, wherein said new connection terminal and a terminal adjacent said new connection terminal serve as base terminals, and the remaining terminals serve as branch terminals.

7. The wiring connector according to claim 6, wherein said new connection terminal and a terminal near said new connection terminal serve as base terminals.

8. A wiring connector comprising a connector housing made of an insulator and a plurality of stages of terminal rows provided in the connector housing, wherein the plurality of stages of terminal rows comprise:

a first terminal row comprising "m" number of terminals;

a second terminal row comprising "n" number of terminals, wherein a base of said first terminal row is attached to a base of said second terminal row;

a new connection terminal formed on a turndown, wherein said turndown attaches said first and second terminal rows to the connector housing and said new connection terminal extends in the same direction as said terminals of said first and second terminal rows; and a third terminal row, wherein said third terminal row is electrically independent of said first terminal row and said second terminal row, and said third terminal row is arranged on the same plane as said first terminal row or said second terminal row; and wherein a sidewall of the connector housing further comprises an aperture, wherein said new connection terminal is exposed to the exterior of the connector housing through said aperture, and a harness is extended from said new connection terminal.

* * * * *